US005816558A

United States Patent [19]

Sommer et al.

[11] Patent Number: 5,816,558

[45] Date of Patent: Oct. 6, 1998

[54] POLE ASSIST HANGER AID

[76] Inventors: Robert L. Sommer, 830 Louise Ave., Fairfield, Ohio 45014; Donald L. Gemperline, 2732 McKinley Ave., Cincinnati, Ohio 45211

[21] Appl. No.: 163,265

[22] Filed: Dec. 6, 1993

(Under 37 CFR 1.47)

[51] Int. Cl.[6] .......... F16M 13/00

[52] U.S. Cl. .......... 248/544; 248/303

[58] Field of Search .......... 248/544, 682, 248/690, 692, 491, 303, 304, 306, 307, 309.1, 309.2, 340, 341, 339; 119/57.8, 57.9, 52.2, 52.3; 194/19.1, 24

[56] References Cited

U.S. PATENT DOCUMENTS

| | | | |
|---|---|---|---|
| 407,883 | 7/1889 | Wilder | 294/19.1 X |
| 519,354 | 5/1894 | Sheppard | 294/19.1 X |
| 1,021,650 | 3/1912 | Worthington | 294/19.1 X |
| 1,852,629 | 4/1932 | Sturges | 294/19.1 X |
| 4,068,817 | 1/1978 | Berger . | |
| 4,153,286 | 5/1979 | Piper et al. . | |
| 4,887,785 | 12/1989 | Blaich . | |
| 4,958,595 | 9/1990 | Richman et al. | 119/57.8 X |
| 5,060,995 | 10/1991 | Goldstein et al. . | |
| 5,181,683 | 1/1993 | Smith | 248/304 X |

FOREIGN PATENT DOCUMENTS

| | | | |
|---|---|---|---|
| 537581 | 5/1959 | Belgium . | |
| 100196 | 11/1940 | Sweden | 248/692 |

*Primary Examiner*—Ramon O. Ramirez
*Attorney, Agent, or Firm*—Charles R. Wilson

[57] ABSTRACT

A pole-assist hanger aid for suspending light-weight objects from an elevated structure. The hanger aid comprises a wire member with a hook-shaped first end to temporarily engage the elevated structure and a second end to engage the light-weight object. An open bottom pole receiving member is offset from the wire member at a mid-portion thereof. It has a hollow interior which is tapered upwardly and is dimensioned to receive an end of an elongated pole. The hanger aid is especially useful for suspending objects such as bird feeders from an elevated tree limb with the use of the pole.

20 Claims, 1 Drawing Sheet

16 15 19 10 18 19 17 27 25 26 29 28

POLE ASSIST HANGER AID

This invention relates to a hanger aid. More particularly, this invention relates to a hanger aid that is used with a pole to suspend light-weight objects from elevated structures.

Many light-weight objects used in a residential setting or in commercial establishments are temporarily suspended from a structure. For example, bird feeders are quite often suspended from a tree limb. Indoor potted plants are suspended from a ceiling hook. Packaged merchandise in a retail outlet can be suspended from a ceiling hook, pipeline or conduit to attract a customer's eye or because of shelf limitations. Often it is desired that the object be suspended at a height well above head level to prevent accidental bumpings. This means that a ladder is normally needed to reach the structure used for suspending the object. In some instances, such as where the light-weight object must be attended to on a daily basis the use of the ladder is very bothersome. For example, it is very inconvenient to get a step ladder from storage on a daily basis, take it outside to a tree holding the bird feeder, climb it and refill the feeder with the bird seed. The same ordeal with tending to house plants or replenishing packaged merchandise suspended from a ceiling hook exists. Improper or careless use of ladders also is a significant cause of many accidents and any means to reduce their use can only be of benefit.

There is a recognition of the problems caused by the need or at least the desire to suspend certain light-weight objects from structures at an elevated height. However, there has been very limited efforts expended to alleviate the problems. U.S. Pat. Nos. 4,068,817 and 4,153,286 contain examples of some of the efforts. The first mentioned patent discloses a suspension hanger for point of purchase display merchandise. The hanger is a helical spring with hooks at either end. An upper hook has a reverse bend and serves to receive the open end of a hollow lifting tube. An elongated tube not commonly found in most homes and commercial establishments is required for use of the hanger. The second mentioned patent discloses a special tool for engaging a hanging ring from which a plant container is suspended and lifting the hanging ring and its container to a ceiling hook. The tool is very specialized in its use.

Various hanger aides of different designs are available for limited end uses. They often suspend an object from an easily reachable structure such as a closet clothes rod. A hanger hook especially designed for hanging a bird feeder from a tree limb is disclosed in U.S. Pat. No. 4,887,785. The hook is designed to resist efforts by squirrels and raccoons to reach the bird food with no regard to easing the efforts needed to hang the bird feeder.

There has now been developed a hanger aid useful for hanging light-weight objects from elevated structures. The hanger aid is economical to produce. It is easy to use with ordinary poles as commonly found in the household and commercial establishments. Most importantly, the hanger aid allows the user to suspend the light-weight object from a structure well above the ordinary reach with a minimum of effort. The object is readily lowered, likewise with a minimum of effort.

SUMMARY OF THE INVENTION

A hanger aid is configured for use in lifting and suspending a light-weight object from an elevated structure. The hanger aid is a wire member having a hook-shaped first end to engage a structure to temporarily hang therefrom, a second end structured to engage the light-weight object to securely retain it and an open bottom pole receiving member offset from the wire member in a mid-portion thereof. The open bottom pole receiving member has a hollow interior which is preferably tapered upwardly to receive an end of an elongated pole in a stable position. The hanger aid is initially secured to the object to be suspended. The pole is inserted into the open bottom pole receiving member and the hanging aid and its secured object lifted to the elevated structure. The hook-shaped first end is placed onto the structure and the pole is removed to leave the hanging aid and light-weight object in a suspended state.

DETAILED DESCRIPTION OF THE INVENTION

The pole assist hanger aid of the invention is described in the following paragraphs and with particular reference to the drawings. The hanger aid is of especial use in hanging bird feeders from tree limbs and the description which follows is directed to this end use. However, the hanger aid of the invention is useful in hanging other light-weight objects such as indoor potted plants, packaged merchandise, hand tools, decorations, extension cords and hoses from ceiling hooks, overhead pipes, overhead conduit, etc.

Figure 1:
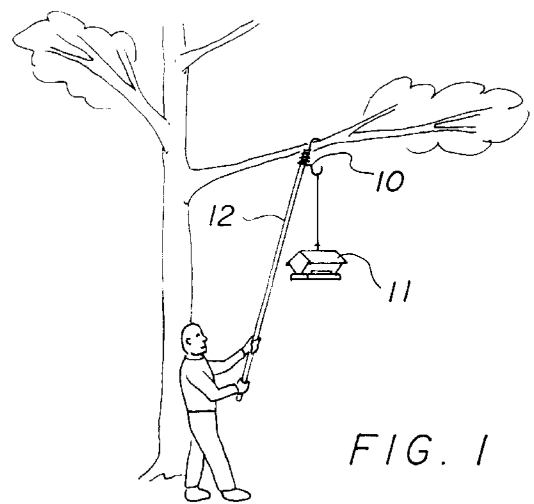
FIG. 1 is an environmental view of the hanger aid of the invention.

With reference to FIG. 1, there is shown the hanger aid 10 of the invention. The hanger aid 10 has a bird feeder 11 secured to it at one end. An elongated pole 12 is temporarily positioned on the hanger aid in a manner described in detail below. After one end of the hanger aid is placed over a tree limb, the pole 12 is withdrawn from the hanger aid, thereby leaving the hanger aid with the secured bird feeder suspended from the tree limb. The hanger aid and bird feeder are readily retrieved by reinserting the pole in the hanger aid as before, lifting and pulling them down.

Figure 2:
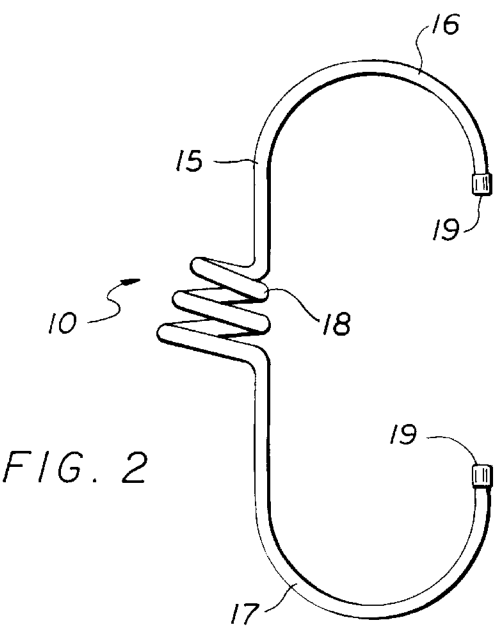
FIG. 2 is an elevational view of the hanger aid of FIG. 1.

As best seen in FIG. 2, the hanger aid 10 comprises a wire member 15 with a hook-shaped first end 16, a second end 17 and an open bottom pole receiving member 18 offset from the wire member in a mid-portion thereof. The hanger aid 10 is unitary in structure. It is configured from aluminum wire, though could as well be made of stainless steel wire, plastic or any other substantially inelastic material capable of being shaped as a wire.

The hook-shaped first end 16 of the hanger aid has a rounded curvature for ease of fitting over and staying on a tree limb. The hook-shaped end is also ideal for positioning on other structures such as pipes, conduits and other hooks. The end 16 is rounded and preferably has a radius of curvature of from about one inch to about three inches. As shown, a soft plastic coating 19 covers the tips of the hook-shaped first end and second end as a safety precaution.

The second end 17 of the hanging aid 10 is shaped to securely hold the bird feeder 11. As shown in FIG. 2, it is also hook-shaped and lies in the same plane as the hook-shaped first end 16. That is, the first and second ends each extend in substantially the same direction from the balance of the wire member. The hook-shaped second end is adapted for hooking onto an eyelet or another hook which is itself fixedly secured to the bird feeder. It can have the same radius of curvature as the hook-shaped first end or be smaller, i.e. from about one-half inch to about two inches. Preferably, the radiuses of curvature are substantially the same to ensure vertically aligned fulcrum points for substantially vertical hanging purposes.

Positioned at a mid-portion of the wire member 15 of the hanger aid 10 is the open bottom pole receiving member 18. It is integral with the wire member and comprises a series of spirals offset from the balance of the wire member. The spirals define a hollow interior which taper upwardly. Preferably, the hollow interior is slanted upwardly at an angle towards the wire member. The slanted hollow interior and opening is on a side of the wire member opposed from the first and second ends. The shape and positioning of the receiving member make it more conducive to receiving an end of the pole and to be retained on the pole during a lifting operation. More preferably for manufacturing reasons, one set of edges of the individual spirals are vertically aligned with the balance of the wire member. Broom sticks, dust mops, clothes props, light-weight pipes or conduits and other elongated objects with a pole-like tip are useful as poles with the hanger aid. Their diameters vary. Accordingly, the opening dimension of the receiving member must accommodate different sized pole diameters. Generally, the opening dimension ranges from about 0.75 inches to about 1.5 inches in cross-width.

Figure 3:
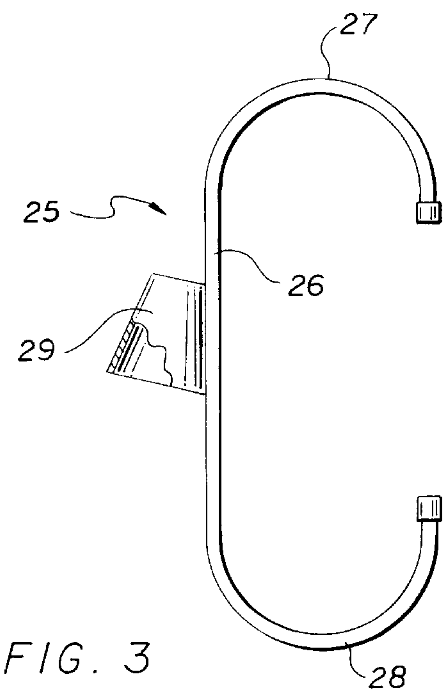
FIG. 3 is an elevational view of another hanger aid of the invention.

FIG. 3 illustrates another hanger aid of the invention. The hanger aid 25 has a wire member 26, a hook-shaped first end 27 and a hook-shaped second end 28 similar to the hanger aid of FIGS. 1 and 2. The open bottom pole receiving member 29, though, is a truncated cone made of sheet metal which is spot-welded to a mid-portion of the wire member. Its open bottom diameter ranges from about 0.75 inches to about 1.5 inches and its hollow interior preferably slants upwardly towards the wire member. The hanger aid 25 is more economically manufactured than the hanger aid 10 of FIGS. 1 and 2, though it is not as strong due to its two-piece construction.

Figure 4:
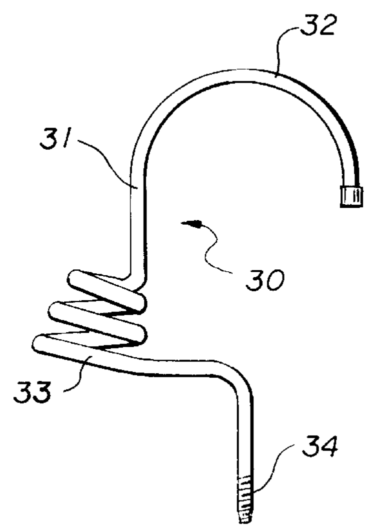
FIG. 4 is an elevational view of still another hanger aid of the invention.

FIG. 4 illustrates another hanger aid of the invention which is more adapted to permanent attachment to the light-weight object. The hanger aid 30 comprises a wire member 31, a hook-shaped first end 32 and an open bottom pole receiving member 33 similar to that found on the hanger aid 10 of FIGS. 1 and 2. However, the second end 34 of the wire member 31 is substantially straight with a set of threads. The threads facilitate a screwing in of the hanger aid's second end into the light-weight object. Once secured to the object, it will remain there. Thus a more secure attachment is achieved. Other attaching means at the end of the second end can be used for a permanent fixing to the light-weight object. The portion of the wire member 31 below the pole receiving member 33 is angled inwardly so that the straight second end 34 extends substantially vertically down from the center point of the hook-shaped first end 32 for reasons of hanging stability advanced above.

While the invention has been described in detail, it should be understood that various modifications can be made. For example, a flat ring can be welded to the wire member to protrude substantially horizontally therefrom. Such a pole receiving member will be able to accommodate a very limited range of pole diameters, though is of still some benefit. All such changes of an obvious nature are considered within a scope of the appended claims.

What is claimed is:

1. A hanger aid for suspending a light-weight object from an elevated structure with the use of an elongated pole, said hanger aid comprising a wire member having (a) a hook-shaped first end to engage the elevated structure to temporarily hang therefrom, (b) a second end to engage the light-weight object to securely retain said light-weight object, and (c) an open bottom receiving member offset from the wire member at a mid-portion thereof, said open bottom receiving member having a hollow interior which is tapered upwardly to temporarily receive an end of the pole in a stable position during a lifting and lowering operation.

2. The hanger aid of claim 1 wherein the open bottom pole receiving member has an open top.

3. The hanger aid of claim 2 wherein the hollow interior of the open bottom pole receiving member is generally slanted upwardly towards the wire member to better receive the elongated pole.

4. The hanger aid of claim 3 wherein the open bottom pole receiving member is a spiral-shaped wire which is integral with the wire member.

5. The hanger aid of claim 1 wherein the open bottom pole receiving member is a truncated cone member permanently attached to the wire member.

6. The hanger aid of claim 1 wherein the hook-shaped first end has a radius of curvature of from about one inch to about three inches.

7. The hanger aid of claim 1 wherein the second end is hook-shaped and lies in substantially the same plane as the hook-shaped first end.

8. The hanger aid of claim 7 wherein the hook-shaped first end and the second end have substantially equal radiuses of curvature.

9. The hanger aid of claim 1 further wherein the second end extends substantially vertically from the open bottom pole receiving member.

10. The hanger aid of claim 9 wherein the second end is substantially straight with attaching means for securing to the light-weight object.

11. The hanger aid of claim 10 wherein the second end is threaded for screwing into the light-weight object.

12. A hanger aid for suspending a light-weight object from an elevated structure with the use of an elongated pole, said hanger aid comprising a wire member having (a) a hook-shaped first end to engage the elevated structure to temporarily hang therefrom, (b) a second end to engage the light-weight object to securely retain said light-weight object, and (c) a spiral-shaped open bottom pole receiving member offset from the wire member at a mid-portion thereof and integral therewith, said pole receiving member defining a hollow interior which is tapered upwardly to temporarily receive an end of the pole in a stable position during a lifting and lowering operation.

13. The hanger aid of claim 12 wherein the second end is hook-shaped.

14. The hanger aid of claim 13 wherein the hook-shaped first end has a radius of curvature of from about one inch to about three inches.

15. The hanger aid of claim 14 wherein the hook-shaped first end and the second end have substantially equal radiuses of curvature.

16. A unitary hanger aid for suspending a light-weight object from an elevated structure with the use of an elongated pole, said hanger aid comprising a substantially inelastic wire member having (a) a hook-shaped first end to engage the elevated structure to temporarily hang therefrom, (b) a second end to securely engage the light-weight object, and (c) a series of spirals at a mid-portion thereof and integral with the hook-shaped first end and second end such that the spirals define a hollow interior which is tapered upwardly at an angle so as to aid in positioning an end of the elongated pole into the hollow interior of the spirals.

17. The unitary hanger aid of claim 16 further wherein a lower-most spiral has a cross-width of from about 0.75 inches to about 1.5 inches to readily receive the end of the elongated pole.

18. The hanger aid of claim 17 wherein the second end is hook-shaped.

19. The hanger aid of claim 18 wherein the hook-shaped first end has a radius of curvature of from about one inch to about three inches.

20. The hanging aid of claim 17 wherein the second end is substantially straight with a set of threads to screw into the light-weight object.

* * * * *